(12) United States Patent
Zong et al.

(10) Patent No.: US 11,381,115 B2
(45) Date of Patent: Jul. 5, 2022

(54) WIRELESS CHARGING DEVICE, WIRELESS CHARGING SYSTEM, AND WIRELESS CHARGING METHOD

(71) Applicant: University of Electronic Science and Technology of China, Chengdu (CN)

(72) Inventors: Xianzheng Zong, Chengdu (CN); Zaiping Nie, Chengdu (CN); Wen Xiong, Chengdu (CN); Jun Hu, Chengdu (CN); Shiwen Yang, Chengdu (CN); Xuyu Ye, Chengdu (CN); Xiaofeng Que, Chengdu (CN); Yongpin Chen, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 0 days.

(21) Appl. No.: 17/209,310

(22) Filed: Mar. 23, 2021

(65) Prior Publication Data

US 2021/0296937 A1 Sep. 23, 2021

(30) Foreign Application Priority Data

Mar. 23, 2020 (CN) .......................... 202010209873.9

(51) Int. Cl.
*H02J 50/23* (2016.01)
*H02J 50/80* (2016.01)
(Continued)

(52) U.S. Cl.
CPC ............. *H02J 50/23* (2016.02); *H01Q 1/243* (2013.01); *H01Q 9/0407* (2013.01);
(Continued)

(58) Field of Classification Search
CPC .......... H02J 50/23; H02J 50/005; H02J 50/40; H02J 50/80; H02J 50/20; H01Q 1/243;
(Continued)

(56) References Cited

U.S. PATENT DOCUMENTS 10,079,494 B2 * 9/2018 Zeine ...................... H02J 5/005
10,141,771 B1 * 11/2018 Hosseini ................. H02J 7/045
(Continued)

*Primary Examiner* — Daniel Cavallari
*Assistant Examiner* — Brian K Baxter
(74) *Attorney, Agent, or Firm* — Matthias Scholl P.C.; Matthias Scholl

(57) ABSTRACT

The disclosure provides a wireless charging device including a metal frequency-selective box and an internal charging system disposed inside the metal frequency-selective box for wireless charging. The internal charging system includes a multi-antenna subsystem including N antenna units; N is an integer greater than 2, and the antenna units are dipole antennas, microstrip patch antennas, microstrip slot antennas, helical antennas, or dielectric resonator antennas. The N antenna units are evenly disposed, in a two-dimensional ring, on inner sides of four side faces of the metal frequency-selective box, or disposed on a three-dimensional curved surface of the entire inner side of the metal frequency-selective box. The device to be energized is disposed in the metal frequency-selective box and is surrounded by the N antenna units.

5 Claims, 7 Drawing Sheets

(51) Int. Cl.
   *H02J 50/40* (2016.01)
   *H02J 50/00* (2016.01)
   *H01Q 1/24* (2006.01)
   *H01Q 9/04* (2006.01)

(52) U.S. Cl.
   CPC ............ H02J 50/005 (2020.01); H02J 50/40 (2016.02); H02J 50/80 (2016.02)

(58) Field of Classification Search
   CPC ...... H01Q 9/0407; H04B 5/0037; H04B 7/02; H04B 7/10
   See application file for complete search history.

(56) References Cited

U.S. PATENT DOCUMENTS

| | | | | |
|---|---|---|---|---|
| 10,559,971 | B2 * | 2/2020 | Zeine | H02J 50/20 |
| 11,172,101 | B1 * | 11/2021 | Boozer | H04R 1/1025 |
| 2005/0156560 | A1 * | 7/2005 | Shimaoka | H02J 50/40 |
| | | | | 320/107 |
| 2008/0174266 | A1 * | 7/2008 | Tamura | H05B 6/76 |
| | | | | 320/107 |
| 2014/0292100 | A1 * | 10/2014 | Lee | H02J 50/12 |
| | | | | 307/104 |
| 2015/0022145 | A1 * | 1/2015 | Kim | H02J 7/025 |
| | | | | 320/108 |
| 2015/0326061 | A1 * | 11/2015 | Davison | H02J 7/025 |
| | | | | 320/108 |
| 2017/0094399 | A1 * | 3/2017 | Chandramohan | H04B 5/0037 |
| 2017/0279294 | A1 * | 9/2017 | Fujii | H02J 7/0027 |
| 2017/0310164 | A1 * | 10/2017 | Abdolkhani | H02J 50/12 |
| 2018/0062414 | A1 * | 3/2018 | Chiu | H02J 7/342 |
| 2018/0064224 | A1 * | 3/2018 | Brzezinski | H02J 7/025 |
| 2018/0278098 | A1 * | 9/2018 | Ogishima | H02J 50/90 |
| 2018/0301917 | A1 * | 10/2018 | Kvols | H02J 50/40 |
| 2019/0067994 | A1 * | 2/2019 | Song | H02J 7/025 |
| 2019/0288567 | A1 * | 9/2019 | Kabiri | H01Q 7/00 |
| 2020/0177225 | A1 * | 6/2020 | Bailey, Jr. | H01F 27/02 |
| 2021/0091602 | A1 * | 3/2021 | Woo | H02J 50/27 |
| 2021/0226481 | A1 * | 7/2021 | Chan | H02J 50/402 |

\* cited by examiner

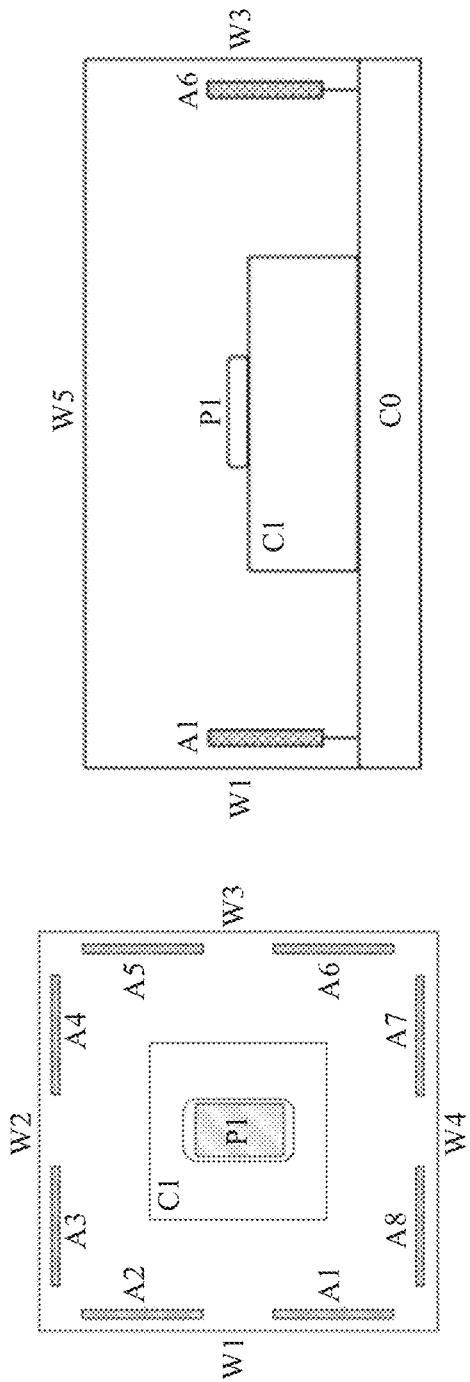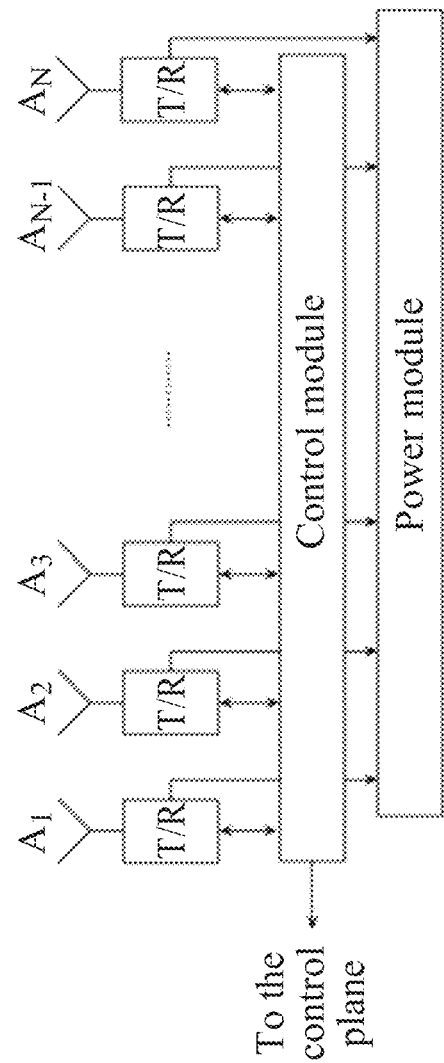
FIG. 4A
FIG. 4B
FIG. 4C

WIRELESS CHARGING DEVICE, WIRELESS CHARGING SYSTEM, AND WIRELESS CHARGING METHOD

CROSS-REFERENCE TO RELATED APPLICATIONS

Pursuant to 35 U.S.C. § 119 and the Paris Convention Treaty, this application claims foreign priority to Chinese Patent Application No. 202010209873.9 filed Mar. 23, 2020, the contents of which, including any intervening amendments thereto, are incorporated herein by reference.

BACKGROUND

The disclosure relates to the field of wireless charging, and more particularly to a wireless charging device, a wireless charging system, and a wireless charging method.

The existing wireless energy transmission methods mainly include technologies such as electromagnetic induction, magnetically-coupled resonance, microwave radiation energy transmission, ultrasonic energy transmission and laser energy transmission. The microwave radiation energy transmission method is gradually favored due to its capability in energy transmission at a long distance and in complex environments. At present, most microwave radiation energy transmission methods mainly focus on two points. The first point is to realize the directional radiation of energy by the design of antenna arrays which depends upon the optimization of the receiving system including the rectifier circuit at the energy receiving side. Wireless energy transmission at a long distance is realized by designing the layout of the microwave power sources and the arrays of transmitting and receiving antennas. This has disadvantages of great difficulty in concentration of energy beams, high energy scattering loss, poor directivity, low transmission efficiency, and high electromagnetic interference to other electronic devices. The other point is to realize wireless energy transmission, by designing the electromagnetic polarization mode and the transmitting and receiving antenna units, in consideration of factors such as the influence of the electromagnetic propagation environment on energy transmission and the influence of the dielectric properties of media on energy transmission in the complex environments. It is mainly applied in wireless charging of implantable electronic devices in the biomedical field and a small number of mobile electronic devices. This has disadvantages that, even if the transmission efficiency is maximized, the amount of energy received by the receiving antenna units is still small, which severely restricts the application of electronic devices.

Most of the existing microwave radiation energy transmission methods pay attention to focusing at a certain point in free space. Since there is very little electromagnetic transmission in complex environments, most studies focus on the focal length, the size of focal spots, and the design of focusing antennas or arrays of antennas. The efficiency of energy transmission is maximized by the optimization of parameters. The wireless energy transmission in confined spaces is very limited.

The existing methods have the following problems and shortcomings: it is unable to realize wireless energy transmission in a closed metal box or cabin environment while ensuring the wireless communication of an energy receiving device with the outside.

The challenge to solve the above problems and deficiencies is how to completely confine, in the energy transmission cabin, the wireless electromagnetic waves at the energy transmission frequency to ensure high transmission efficiency, while allowing the wireless mobile communication frequency of the energy receiving device to pass through the box to maintain its communication or data access capability.

SUMMARY

The disclosure provides a wireless charging device, a wireless charging system, and a wireless charging method.

The wireless charging device comprises:

a metal frequency-selective box; and an internal charging system disposed inside the metal frequency-selective box for wireless charging.

The internal charging system comprises a multi-antenna subsystem comprising N antenna units; N is an integer greater than 2, and the antenna units are dipole antennas, microstrip patch antennas, microstrip slot antennas, helical antennas, or dielectric resonator antennas;

the N antenna units are evenly disposed, in a two-dimensional ring, on inner sides of four side faces of the metal frequency-selective box, or disposed on a three-dimensional curved surface of the entire inner side of the metal frequency-selective box; and a device to be energized is disposed in the metal frequency-selective box and is surrounded by the N antenna units.

Further, an operation and display panel is disposed on one side face or the top of the metal frequency-selective box;

the N antenna units are polarized by linear polarization or circular polarization; the linear polarization comprises horizontal linear polarization, vertical linear polarization, and ±45° slant polarization; and the circular polarization comprises left-hand circular polarization and right-hand circular polarization;

the multi-antenna subsystem further comprises a plurality of receiving-transmitting components; one receiving-transmitting component corresponds to one antenna unit to form an active antenna; each receiving-transmitting component comprises a receiving antenna unit and a transmitting antenna unit; and the height direction of the metal frequency selective box is z-axis; the receiving antenna units and the transmitting antenna units are disposed on one plane, placed along the z-axis, with a distance of 120 mm between adjacent transmitting antenna units, and 16 antenna units form a square with sides of length 500 mm; and the frequencies for the communication and data exchange of mobile devices to be energized with the outside comprise 3G, 4G, 5G, WiFi, Bluetooth and GPS, the electromagnetic waves of which can penetrate the band-pass frequency-selective network without hindrance, while the electromagnetic waves corresponding to the charging frequency cannot penetrate the band-pass frequency-selective network.

The disclosure also provides a wireless charging system, comprising:

the wireless charging device;

a wireless charging subsystem, the wireless charging subsystem comprising an information receiving module, configured to receive an amplitude and phase data of a reference signal at a charging frequency, the reference signal coming from the device to be charged, and an electromagnetic field forming module, configured to transmit a wireless charging signal to form a focused electromagnetic field through the configuration of the amplitude and phase during signal transmission; and a mobile terminal subsystem, the mobile terminal subsystem comprising an information transmission module, configured to transmit the amplitude and phase data of the reference signal at the charging frequency, and an electromagnetic energy receiving module, configured to charge batteries of a mobile device by a receiving antenna and a rectification and output circuit.

In another aspect, the disclosure further provides a wireless charging method using the wireless charging system, the method comprising:

S1: transmitting, by a mobile device to be energized, amplitude and phase data of a reference signal at a charging frequency;

S2: receiving the amplitude and phase data of the reference signal at the charging frequency transmitted by the mobile device to be energized;

S3: transmitting a wireless charging signal to the mobile device to be energized, to form a focused electromagnetic field at the mobile device to be energized by the configuration of the amplitude and phase during the signal transmission; and S4: charging the batteries of the mobile device to be energized by the receiving antenna and the rectification and output circuit of the mobile device to be energized.

Further, the mobile device to be energized transmits the reference signal at the charging frequency, receives reference signals for different antenna units in a multi-antenna subsystem, and calculates relative phase delay and amplitude information of a signal received by the antenna units based on the reference signals.

Further, according to the phase data of the reference signal received by an antenna unit, an initial phase for the feed of this antenna unit is set by the electromagnetic field forming module, and the acquired phase delay data is converted into the phase lead of the same magnitude, so that the charging signals transmitted by the antenna units are superposed in-phase when reaching the mobile device to be energized; the amplitude at each antenna unit is controlled at the same amplitude as the received signal, or is divided into several levels and power is supplied at integral multiples according to the strength interval of the received signal.

Further, the phase and amplitude of the multi-antenna subsystem are fed, the signals transmitted by the antenna units are received when reaching the mobile device to be energized, and power is then rectified and output; and after the charging of the mobile device to be energized is completed, a confirmation signal is transmitted and the power supply is stopped upon receiving the confirmation signal, a prompt is displayed, and the charging process ends.

Further, the wireless charging method further comprises: when the mobile device to be energized is configured to charge a plurality of mobile phones at the same time, the control system collects in sequence, for the antenna units of the multi-antenna subsystem, the phase and amplitude of the reference signals from the mobile phones in the receiving stage, and during the transmission, for the antenna units of the multi-antenna subsystem, directly magnifies the conjugate of the reference signals from the mobile phones by a certain multiple and then linearly superpose the signals. From the 1st to the Nth antenna unit, the reference signals for the 1st to the Mth mobile phone received in order are respectively:

$$S_{ij}=A_{ij}*\exp(\varphi_{ij})$$

where $S_{ij}$ indicates that an i-th antenna receives the reference signal of a j-th mobile phone, i=1, ... N; j=1, ... M, A represents amplitude, and φ represents phase;

during the transmission of each antenna unit, the power supply signal should be:

$$P_i=E*\Sigma A_{ij}*\exp(-\varphi_{ij})$$

where i=1, ... N, E is the magnification multiple, Σ is the summation, that is, the linear superposition operation, and the negative sign − indicates that a complex phase has been conjugated during the transmission.

Combining all the above technical solutions, the disclosure has the following advantages and beneficial effects: the disclosure is designed for wireless charging requirements of different types of mobile communication devices under normal working conditions while minimizing electromagnetic pollution to the environment. By using the adaptive spatial focusing technology, and by combining the metal frequency-selective box based on the frequency-selective surface and the novel wireless charging technology, the simultaneous wireless charging of multiple mobile communication devices of different brands, different types and different placements can be realized, without hindering the normal communication of the devices. The disclosure provides a novel wireless charging device with the advantages of high transmission efficiency, stable transmission, and environmentally friendly.

The mobile phone charging equipment of the disclosure realizes wireless charging of a mobile phone based on the time reversal principle in a complex environment, and transmits a reference signal through a mobile phone to be energized, so that each antenna unit of the multi-antenna subsystem can receive the delay of the propagation phase and the attenuation of the signal under multi-path synthesis; then, according to the principle of reciprocity, when the multi-antenna subsystem transmits signals at a same frequency, the phase lead of the same magnitude is realized at least based on the phase delay data obtained originally, or conjugation is performed, or a more intelligent solution is used. In this way, when paths of charging power reach the mobile phone, the field components may be superimposed in phase, to achieve the focusing of the field at the mobile phone and thus charge the mobile phone.

In the disclosure, by the adaptive focusing technology, the electromagnetic energy for wireless charging can be concentrated to the maximum extent at the position where the energy receiving antennas of the mobile phone to be energized are located, while the strength of the field at other positions in the box is weaker. Furthermore, since the electromagnetic waves at the charging frequency cannot penetrate the box, the energy is completely limited inside the box. Therefore, the transmission efficiency of the entire link is high, up to 80% or even more than 90%. Since the metal frequency-selective box uses a broadband, band-pass frequency-selective network, electromagnetic waves at various operating frequencies of the mobile phone, including signals such as mobile communication, Bluetooth, WiFi, GPS, etc., can penetrate the box. In this way, the mobile phone can continue to maintain its communication access and data transmission capabilities while being charged. Since the metal frequency-selective box uses a band-pass frequency-selective network, the transmission power can be limited inside the box to the greatest extent while ensuring high transmission efficiency and maintaining communication, which can basically avoid the electromagnetic pollution to the environment during charging. The disclosure allows the mobile phone to be energized to be placed at any position and in any posture in the charging box. The charging system can efficiently transmit electromagnetic energy. In the simplest case, the system control circuit only needs to lock the phase of the reference signal received by each antenna unit. The antenna unit may be selected flexibly. The form of units, which has been technically mature, may be used. Furthermore, a number of polarization methods may be used. Through miniaturized design and integrated design, the arrangement of the multi-antenna subsystem of the charging system in the box is flexible.

The disclosure realizes wireless energy transmission based on the time reversal principle, and has two major advantages: 1. the time reversal field has space-time synchronous focusing characteristics, including time compression characteristics and spatial focusing characteristics, which can effectively reduce the interference to the propagation of electromagnetic waves in a complex and non-uniform environment and the multipath delay attenuation; 2. due to the adaptive characteristics of the environment, when the transmitting unit receives a detection signal from the target position to be measured, time reversal is performed on the signal, and the signal is magnified by a certain multiple and then transmitted reversely. That is, the transmitting units distributed in multiple positions can adaptively transmit energy to a specific position at the same time, thereby realizing wireless energy transmission. The main advantage of this technology is that it does not rely on the determination of known models, and can enable microwave radiation energy transmission technology to perform adaptive energy transmission in a complex position environment and with prior knowledge of the target position. By only one measurement by the detection signal, the excitation required by each transmitting unit can be obtained, showing great potential of the time reversal technology in power transmission. In addition, by adaptive focusing by using this technology, energy can be concentrated on the target position to a great extent. The less concentration of energy near the target position can greatly reduce the harm of the transmitted energy to the vicinity of the target position and reduce the electromagnetic pollution caused by energy, as wireless radiation, which has not yet been received.

BRIEF DESCRIPTION OF THE DRAWINGS

FIGS. 4A-4C are structure diagrams of an internal model according to an embodiment of the disclosure; specifically, FIGS. 4A-4C are a top view, a front view, and a logical relationship diagram of the internal charging system, respectively; where W1-W4 represent four sidewalls of the box; A1-A8 represent antenna units in the multi-antenna subsystem; P1 represents a mobile phone device to be energized; C1 represents a bracket/base for placing the mobile phone to be energized; T/R represents radio frequency receiving-transmitting components for the antenna unit;

DETAILED DESCRIPTION

In view of the problems in the prior art, the disclosure provides a wireless charging device, a wireless charging system, and a wireless charging method. The disclosure will be described in detail below with reference to the accompanying drawings.

Figure 1:
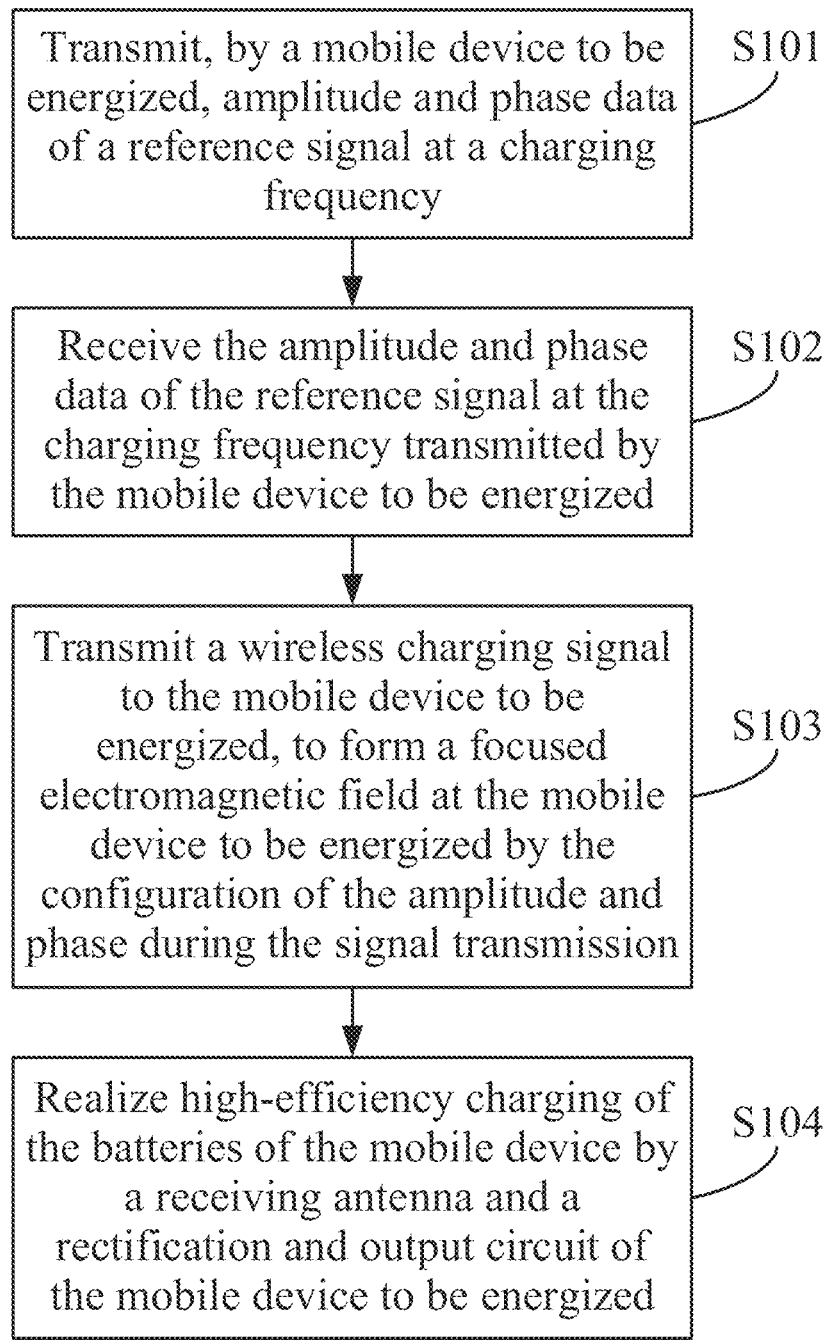
FIG. 1 is a flowchart of a wireless charging method according to an embodiment of the disclosure.

As shown in FIG. 1, the wireless charging method according to one embodiment of the disclosure comprises the following steps:

S101: transmitting, by a mobile device to be energized, amplitude and phase data of a reference signal at a charging frequency;

S102: receiving the amplitude and phase data of the reference signal at the charging frequency transmitted by the mobile device to be energized;

S103: transmitting a wireless charging signal to the mobile device to be energized, to form a focused electromagnetic field at the mobile device to be energized by the configuration of the amplitude and phase during the signal transmission; and S104: charging the batteries of the mobile device by a receiving antenna and a rectification and output circuit of the mobile device to be energized.

Figure 2:
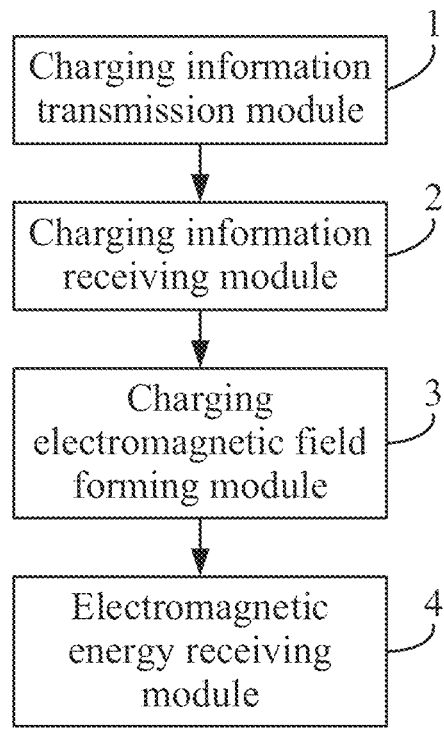
FIG. 2 is a schematic structure diagram of a wireless charging system according to an embodiment of the disclosure; where 1: charging information transmission module; 2: charging information receiving module; 3: charging electromagnetic field forming module; and 4. electromagnetic energy receiving module.
Figure 3:
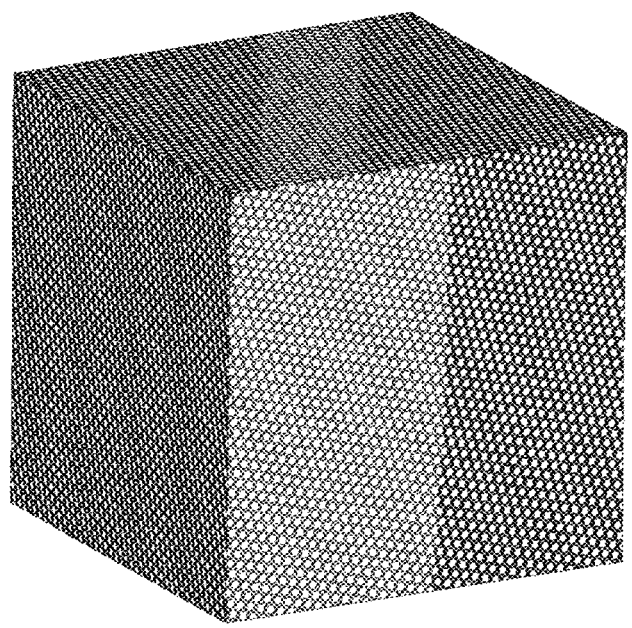
FIG. 3 is a schematic structure diagram of a metal frequency-selective box according to an embodiment of the disclosure.

As shown in FIG. 2, the wireless charging system according to another embodiment of the disclosure comprises:

an information transmission module 1, configured to transmit amplitude and phase data of a reference signal at a charging operating frequency;

an information receiving module 2, configured to receive the transmitted amplitude and phase data of the reference signal at the charging frequency;

an electromagnetic field forming module 3, configured to transmit a wireless charging signal to form a focused electromagnetic field through the configuration of amplitude and phase during the signal transmission; and an electromagnetic energy receiving module 4, configured to realize high-efficiency charging of mobile device batteries by a receiving antenna and a rectification and output circuit.

The technical solution of the disclosure will be further described below with reference to the accompanying drawings.

In the disclosure, based on the amplitude and phase data of the reference signal at the charging frequency received by the multi-antenna subsystem and transmitted by the mobile phone to be energized, the control module of the charging system further transmits the wireless charging signal to the mobile phone to be energized via the multi-antenna subsystem. By the configuration of the amplitude and phase during the transmission, a focused electromagnetic field is formed at the mobile phone to be energized. By the receiving antenna and the rectification and output circuit of the mobile phone to be energized, high-efficiency charging of batteries of the mobile phone is realized. During the energy transmission and charging, since the built-in charging system and the metal frequency-selective box of the mobile phone to be energized use, on their four sidewalls and tops, frequency-selective surfaces through which the communication frequency can penetrate, calls can be answered, short messages and WeChat messages can be received, and other data can be transmitted. The method comprises the following steps.

S1: One side face or the top of the box (depending upon the specific product design) is opened, the mobile phone to be energized is placed on the bracket/base, the corresponding APP in the mobile phone is opened, and then the box is closed.

S2: The control panel on the side face or top of the box (depending upon the specific product design) is operated to make the charging system in a state of waiting for charging.

S3: Under the spontaneous control of the mobile phone system APP to be energized, a reference signal at the charging frequency is transmitted to the multi-antenna subsystem of the charging system, the control module of the charging system can receive the reference signals for the different antenna units in the multi-antenna subsystem, and then the relative phase delay and amplitude information of the signal received by the antenna units can be calculated based on the reference signals.

S4: After the analysis is completed, and according to the panel information feedback, the panel of the box is further operated to enter the power supply mode. According to the phase data of the reference signal received by the antenna unit in the system in S3, the control module sets an initial phase for the feed of this antenna unit, that is, converts the acquired phase delay data into the phase lead of the same magnitude, so that the charging signals transmitted by the antenna units are superposed in-phase when reaching the mobile phone; the amplitude at each antenna unit may be controlled, by the feed module, at the same amplitude as the received signal, depending upon the precision of control, or may be divided into several (for example, 2 to 6) levels and power is supplied at integral multiples according to the strength interval of the received signal.

S5: The control module of the charging system feeds, with resources from the power module, its multi-antenna subsystem according to the phase and amplitude in S4. The signals transmitted by the antenna units propagate through the complex multipath environment in the metal frequency-selective box and then reach the mobile phone to be energized, where the signals are superposed in-phase and field focusing is realized. Then, the signals are received and power is then rectified and output.

Step 6: After the charging is completed, the mobile phone APP transmits a confirmation signal. The charging system stops feeding upon receiving the confirmation signal, and displays a prompt on the panel on the outer surface of the box. Then, the charging process ends.

The external information link can work normally during the wireless charging process, since the metal frequency-selective box in the disclosure uses, on its four sidewalls and top, band-pass frequency-selective networks and the electromagnetic waves corresponding to the frequency for the mobile phone to communicate with the outside, including frequencies such as 3G, 4G, 5G, WiFi, Bluetooth and GPS, can penetrate through the box. The charging frequency of the internal charging system is different from the communication frequency of the mobile phone, and is not within the pass-band of the frequency-selective surface of the box, that is, the electromagnetic waves corresponding to the frequency for wireless charging cannot penetrate through the metal frequency-selective box.

An operation and display panel is disposed on one side face or top of the metal frequency-selective box in the disclosure, by which charging preparation, collection of reference signals, wireless charging, powering off and other operations can be performed. And, the operation stage or the status of completion may be prompted by a liquid crystal display or an LED.

The multi-antenna subsystem of the internal charging system in the disclosure comprises N antenna units, N being an integer greater than 1. The antenna units may be dipole antennas, microstrip patch antennas, microstrip slot antennas, helical antennas, or dielectric resonator antennas, etc.

The N antenna units may be evenly disposed, in a two-dimensional ring, on inner sides of four side faces of the metal frequency-selective box, or disposed on a three-dimensional curved surface of the entire inner side of the box.

The N antenna units may be polarized by linear polarization (comprising horizontal linear polarization, vertical linear polarization, ±45° slant polarization, etc.) or circular polarization (comprising left-hand circular polarization and right-hand circular polarization).

The multi-antenna subsystem comprises a plurality of receiving-transmitting components, one receiving-transmitting component corresponds to one antenna unit to form an active antenna, which can not only complete the collection of the amplitude and phase information of the reference signal transmitted by the mobile phone device to be energized, but also physically cooperate with the control module to control the amplitude and phase of the power to be transmitted in the transmission and energy transfer stage.

The wireless charging device for mobile phones in the disclosure can charge M mobile phones at the same time as long as the space of the box permits, M being a positive integer greater than or equal to 1. That is, the bracket/base of the mobile phone device to be energized can simultaneously hold M mobile phones.

When the device is used to charge a plurality of mobile phones at the same time, the control system collects in sequence, for the antenna units of the multi-antenna subsystem, the phase and amplitude of the reference signals from the mobile phones in the receiving stage, and during the transmission, for the antenna units of the multi-antenna subsystem, directly magnifies the conjugate of the reference signals from the mobile phones by a certain multiple and then linearly superpose the signals. That is, suppose that, from the 1st to the Nth antenna unit, the reference signals for the 1st to the Mth mobile phone received in order are respectively:

$$S_{ij}=A_{ij}*\exp(\varphi_{ij})$$

where $S_{ij}$ indicates that an i-th antenna receives the reference signal of a j-th mobile phone, i=1, . . . N; j=1, . . . M. A represents amplitude, and φ represents phase;

then, during the transmission of each antenna unit, the power supply signal should be:

$$P_i=E*\Sigma A_{ij}*\exp(-\varphi_{ij})$$

where i=1, . . . N, E is the magnification multiple, Σ is the summation, that is, the linear superposition operation, and the negative sign – indicates that a complex phase has been conjugated during the transmission.

In the disclosure, the receiving antennas and the transmitting antennas in the charging system are combined together. The transmitting-receiving antennas are uniformly used.

Figure 5:
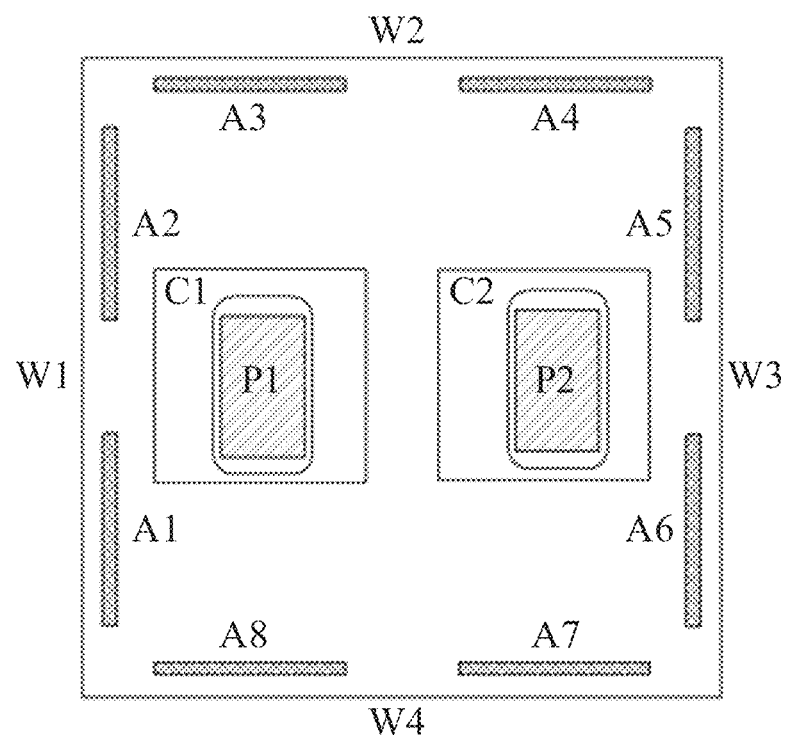
FIG. 5 is a schematic diagram of charging two mobile phones at the same time according to an embodiment of the disclosure; where P1-P2 represent mobile phone devices to be energized; C1-C2 represent brackets/bases for placing the mobile phones to be energized.
Figure 6A:
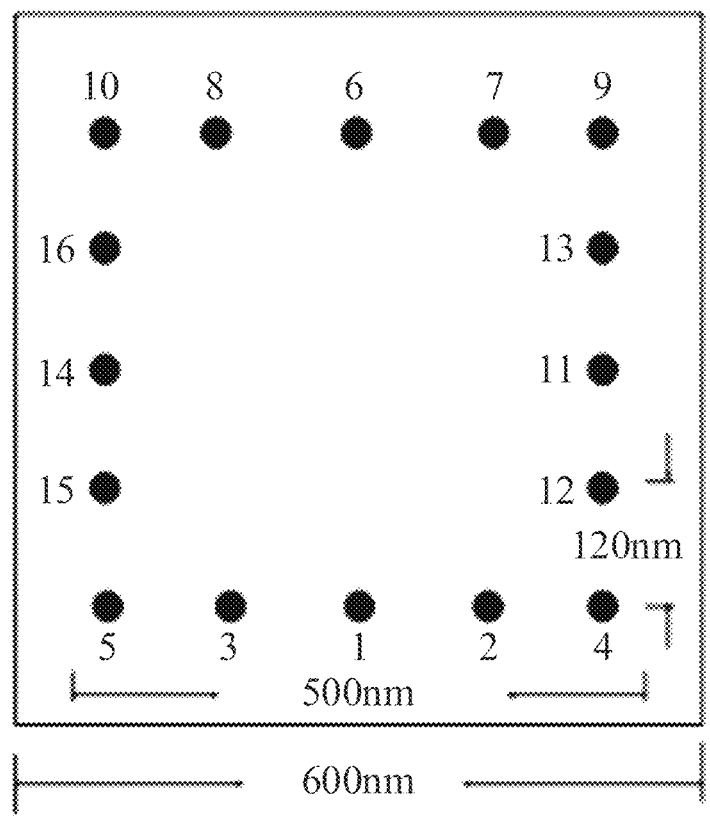
FIGS. 6A-6B are a used wireless charging system model according to an embodiment of the disclosure; where 1-16 represent antenna units of the multi-antenna subsystem.
Figure 6B:
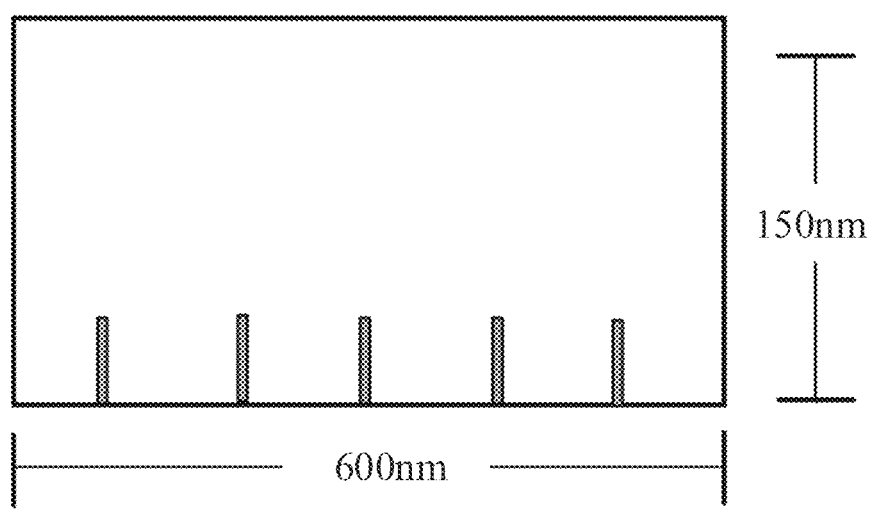

The multi-antenna system shown in FIG. 5 is configured to build the internal wireless charging system. The monopole antenna is used as the antenna unit. The size of the metal frequency-selective box is 600 mm (length)×600 mm (width)×150 mm (height). A receiving antenna is equivalent to a charging mobile phone. The receiving antenna units and the transmitting antenna units are disposed on a same plane and both are placed along a z-axis. The height direction of the metal frequency selective box is z-axis. The distance between adjacent transmitting antenna units is 120 mm, and 16 antenna units form a square with sides of length 500 mm.

First, the receiving antenna sends a reference signal, and the reference signal reaches the multi-antenna system after being propagated in the box. Each antenna unit of the multi-antenna system receives the reference signal and sends it to the control module. The control module obtains the relative phase information of each antenna unit. Then, the control system uses the opposite value of the received relative phase as the phase of the feed signal, and feeds the multi-antenna system through the TR component and the power module to realize wireless charging.

Figure 7A:
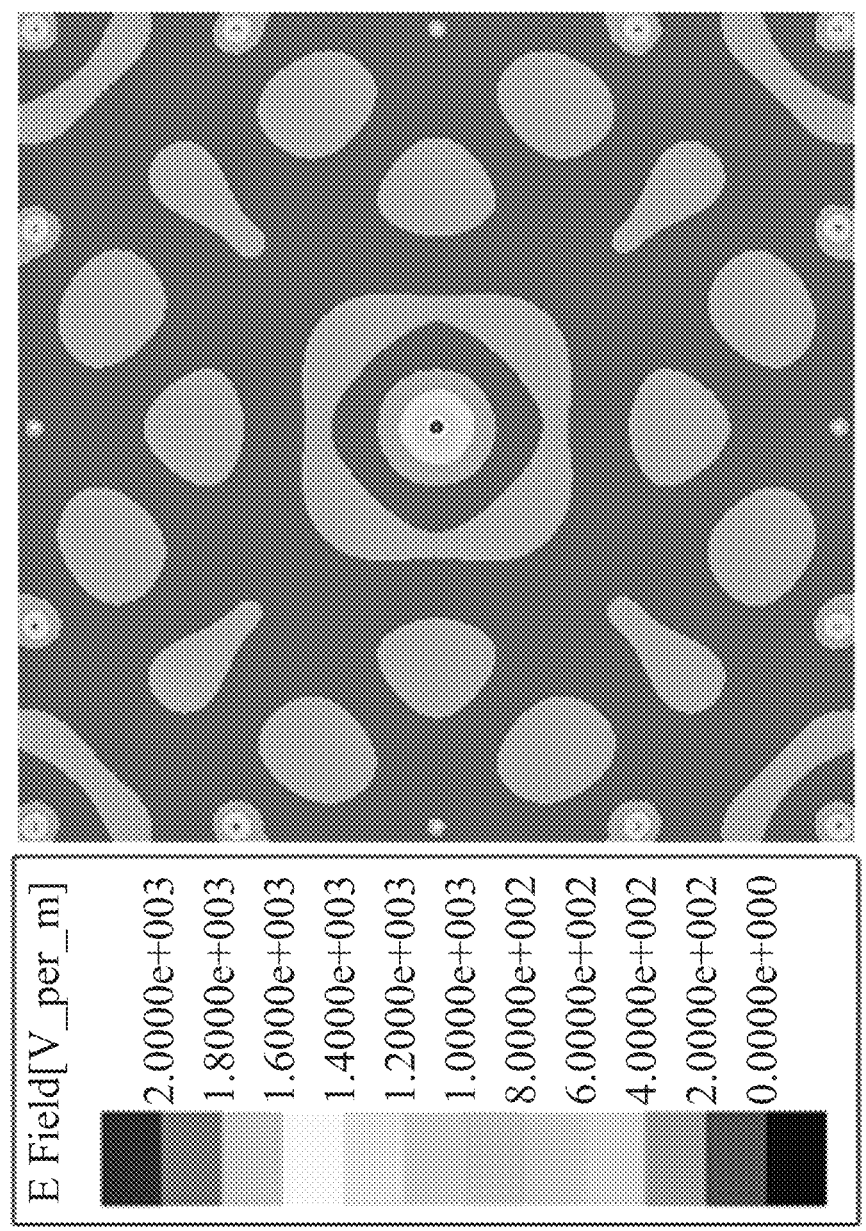
FIGS. 7A-7B show the effect of wireless charging according to an embodiment of the disclosure, with the field strength distributions after energy concentration.
Figure 7B:
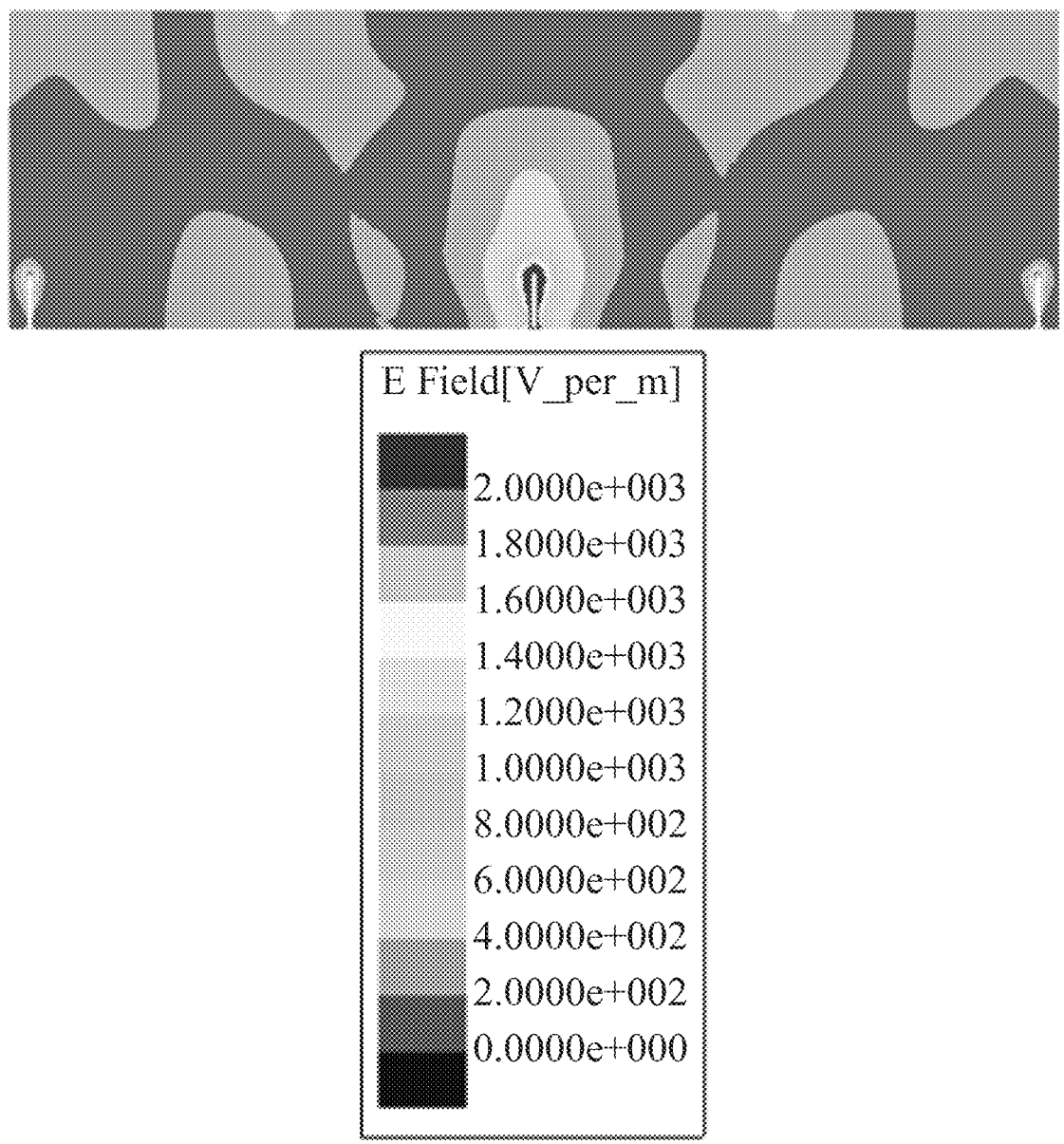

As shown in FIGS. 7A-7B, the simulation results are as follows: in the position detection phase, the power of the detection signals transmitted by the receiving antenna units is 1 W, and the sum of power of the detection signals received by all the transmitting antenna units is about 830.63 mW; in the energy transmission phase, assuming that the energy amplification factor for all transmitting antenna units is 1, the power obtained by the receiving antenna after adaptive focusing is about 689.88 mW, and the energy transmission efficiency of adaptive focusing is about 83.06%, which proves the effectiveness of the device of the disclosure.

The embodiments of the disclosure may be implemented by hardware, software, or a combination of software and hardware. The hardware part may be implemented by dedicated logic; the software part may be stored in a memory and executed by appropriate instruction execution systems (such as microprocessors) or dedicated design hardware. It may be understand by a person of ordinary skill in the art that the above-mentioned devices and methods may be implemented by using computer-executable instructions and/or by being included in processor control codes that are provided on carrier media such as disks, CDs or DVD-ROMs, programmable memories such as read-only memories (firmware) or data carriers such as optical or electronic signal carriers. The device and its modules of the disclosure may be implemented by hardware circuits of very large scale integrated circuits or gate arrays, semiconductors such as logic chips and transistors, or programmable hardware devices such as field programmable gate arrays and programmable logic devices, or may be implemented by software executed by various types of processors, or may be implemented by a combination of the above-mentioned hardware circuits and software, such as firmware.

It will be obvious to those skilled in the art that changes and modifications may be made, and therefore, the aim in the appended claims is to cover all such changes and modifications.

What is claimed is:

1. A wireless charging device, comprising:
   1) a metal frequency-selective box; and
   2) an internal charging system disposed inside the metal frequency-selective box for wireless charging equipment;
   wherein:
      the internal charging system comprises a multi-antenna subsystem comprising N antenna units; N is an integer greater than 2, and the antenna units are dipole antennas, microstrip patch antennas, microstrip slot antennas, helical antennas, or dielectric resonator antennas; the N antenna units are evenly disposed, in a two-dimensional ring, on inner sides of four side faces of the metal frequency-selective box, or disposed on a three-dimensional curved surface of an inner side of the metal frequency-selective box;
      when in use, a device to be energized is disposed in the metal frequency-selective box and is surrounded by the N antenna units;
      the N antenna units are polarized by linear polarization or circular polarization; the linear polarization comprises horizontal linear polarization, vertical linear polarization, and ±45° slant polarization; and the circular polarization comprises left-hand circular polarization and right-hand circular polarization;
      the multi-antenna subsystem further comprises a plurality of receiving-transmitting components; one receiving-transmitting component corresponds to one antenna unit to form an active antenna; each receiving-transmitting component comprises a receiving antenna unit and a transmitting antenna unit;
      a height direction of the metal frequency selective box is z-axis; receiving antenna units and transmitting antenna units are disposed on one plane, placed along the z-axis, with a distance of 120 mm between adjacent transmitting antenna units, and 16 antenna units form a square with sides of length 500 mm; and
      frequencies for the communication and data exchange of mobile devices to be energized with outside comprise 3G, 4G, 5G, WiFi, Bluetooth and GPS, the electromagnetic waves of which penetrate a band-pass frequency-selective network without hindrance, while the electromagnetic waves corresponding to a charging frequency fail to penetrate the band-pass frequency-selective network.

2. A system, comprising:
   the wireless charging device of claim 1;
   a wireless charging subsystem, the wireless charging subsystem comprising an information receiving module, configured to receive an amplitude and phase data of a reference signal at a charging frequency, the reference signal coming from the device to be charged, and an electromagnetic field forming module, configured to transmit a wireless charging signal to form a focused electromagnetic field through configuration of the amplitude and phase during signal transmission.

3. A wireless charging method, the method comprising:
   transmitting, by a mobile device to be energized, amplitude and phase data of a reference signal at a charging frequency;
   receiving, by the system of claim 2, the amplitude and phase data of the reference signal at the charging frequency transmitted by the mobile device to be energized;
   transmitting a wireless charging signal by the system of claim 2 to the mobile device to be energized, to form a focused the electromagnetic field at the mobile device to be energized by the configuration of the amplitude and phase during the signal transmission; and
   charging the batteries of the mobile device to be energized by the receiving antenna and the rectification and output circuit of the mobile device to be energized;
   the mobile device to be energized transmits the reference signal at the charging frequency, receives reference signals for different antenna units in a multi-antenna subsystem, and calculates relative phase delay and amplitude information of a signal received by the antenna units based on the reference signals;

according to the phase data of the reference signal received by an antenna unit, an initial phase for the feed of the antenna unit is set by the electromagnetic field forming module, and acquired phase delay data is converted into a phase lead of the same magnitude, so that the charging signals transmitted by the antenna units are superposed in-phase when reaching the mobile device to be energized; the amplitude at each antenna unit is controlled at the same amplitude as a received signal, or is divided into several levels and power is supplied at integral multiples according to a strength interval of the received signal.

4. The method of claim 3, wherein:

the phase and amplitude of the multi-antenna subsystem are fed, the signals transmitted by the antenna units are received when reaching the mobile device to be energized, and power is then rectified and output; and after the charging of the mobile device to be energized is completed, a confirmation signal is transmitted and the power supply is stopped upon receiving the confirmation signal, a prompt is displayed, and a charging process ends.

5. The method of claim 4, wherein the wireless charging method further comprises: when the mobile device to be energized is configured to charge a plurality of mobile phones at the same time, the control system collects in sequence, for the antenna units of the multi-antenna subsystem, the phase and amplitude of the reference signals from the mobile phones in the receiving stage, and during the transmission, for the antenna units of the multi-antenna subsystem, directly magnifies the conjugate of the reference signals from the mobile phones by a certain multiple and then linearly superpose the signals; from the 1st to the Nth antenna unit, the reference signals for the 1st to the Mth mobile phone received in order are respectively:

$$S_{ij} = A_{ij} * \exp(\varphi_{ij})$$

where $S_{ij}$ indicates that an i-th antenna receives the reference signal of a j-th mobile phone, i=1, ... N; j=1, ... M, A represents amplitude, and $\varphi$ represents phase;

during the transmission of each antenna unit, the power supply signal is:

$$P_i = E * \Sigma A_{ij} * \exp(-\varphi_{ij})$$

where i=1, ... N, E is a magnification multiple, $\Sigma$ is a magnification multiple, is a summation, which is a linear superposition operation, and a negative sign − indicates that a complex phase has been conjugated during the transmission.

\* \* \* \* \*